United States Patent [19]

Chan

[11] Patent Number: 4,584,556

[45] Date of Patent: Apr. 22, 1986

[54] RATIO COMPARATOR FOR DIGITAL SIGNALS

[75] Inventor: Steven S. Chan, Fremont, Calif.

[73] Assignee: Ampex Corporation, Redwood City, Calif.

[21] Appl. No.: 684,168

[22] Filed: Dec. 21, 1984

Related U.S. Application Data

[63] Continuation of Ser. No. 364,923, Apr. 2, 1982, abandoned.

[51] Int. Cl.$^4$ .............................................. G06F 7/02
[52] U.S. Cl. .............................................. 340/146.2
[58] Field of Search ...................... 340/146.2; 364/764

[56] References Cited

U.S. PATENT DOCUMENTS 3,852,581  12/1974  Reynard .............................. 364/767
4,374,427  2/1983  Katayama .......................... 364/764

OTHER PUBLICATIONS

Hemel, "Making Small ROM's Do Math Quickly, Cheaply and Easily", *Electronics*, May 11, 1970, pp. 104–111.

Stefanelli, "Binary Read-Only-Memory Dividers", *Alta Frequenza* (Italy) vol. 48, No. 11, Nov. 1979, pp. 690–693.

*Primary Examiner*—David H. Malzahn
*Attorney, Agent, or Firm*—James A. LaBarre; Joel D. Talcott

[57] ABSTRACT

In a system for comparing the ratio of two numbers to a threshold, the bits of each number are compared in groups comprising less than the total number of bits. The most significant group of bits are first compared, and if they contain sufficient information to make the comparison, the result thereof is indicated. If the most significant group of bits does not contain sufficient information, the comparison is made based upon the next higher order group of bits that does contain sufficient information. In some situations, it is desirable to obtain information about the next lower order group of bits in order to verify whether a determination is correct. Each of these situations has a unique address in a memory unit dedicated to the next lower order group of bits. In response to an input signal indicating that a determination subject to verification has been made, this memory unit provides an output signal that indicates the validity of the determination, based upon input information to this memory unit that is not contained in the higher order group of bits.

24 Claims, 5 Drawing Figures

H1, M1, $\overline{L1}$ - BINARY STATE

FIG. 3

H3, M3 – RELINQUISH CONTROL

H2, M2 - ENABLE NEXT PROM

M4, L4 – MODIFY

RATIO COMPARATOR FOR DIGITAL SIGNALS

This application is a continuation of application Ser. No. 364,923, filed Apr. 2, 1982, now abandoned.

CROSS-REFERENCE TO RELATED APPLICATION

Reference is made to copending application Ser. No. 365,085, filed Apr. 2, 1982, now Pat. No. 4,462,051, entitled "Demodulator For An Asynchronous Binary Signal", which discloses some subject matter that is common to the present disclosure. The subject matter disclosed in that application is incorporated herein by reference thereto.

BACKGROUND OF THE INVENTION

The present invention relates to a system for comparing two numbers or words, and more particularly to a system for determining whether the ratio of two binary numbers exceeds a reference value.

In the past, the high-speed comparison of two binary numbers in a memory device required a substantial amount of memory capacity. For example, a read-only memory (ROM) or a programmable read-only memory (PROM) for comparing the ratio of all possible combinations of two eight-bit numbers against a predetermined reference ratio might require over 65,000 bits of memory capacity. These memory requirements increase exponentially as the number of bits in the numbers to be compared increases.

The reason that such a substantial amount of memory capacity has been required in the past, particularly when the numbers to be compared contain more than just a few bits of information, is due largely to the fact that all of the bits in one number are compared against all of the bits of the other number at one time. The total number of bits in both numbers determines the number of input signals to the memory unit, and is determinative of the number of memory locations required. For example, the comparison of two eight-bit numbers provides sixteen input signals and requires approximately $2^{16}$ memory locations.

Attempts at reducing the total number of required memory locations can result in a reduction in the reliability of the comparison process. For example, if only the more significant bits of each number are examined to thereby reduce the total number of input signals, an intelligent result cannot be obtained in those situations in which the difference between the two numbers is small and the more significant bits are the same or almost the same for both numbers. Other approaches using switches or shift registers, for example, have resulted in systems that are considerably slower because of their relative complexity and the time required to shift bits of information or perform switching operations.

OBJECTS AND BRIEF SUMMARY OF THE INVENTION

Accordingly, it is a general object of the present invention to provide a novel system for comparing the ratio of two numbers against a predetermined reference at a high speed and with minimal memory requirements.

It is another object of the present invention to provide a novel system for comparing the ratio of two binary numbers that separately analyzes groups of bits that have different levels of significance in the numbers.

It is a further object of the present invention to provide a novel system of the above-mentioned type that is able to rely upon information from the analysis of a lower-order group of bits when the higher order group of bits alone does not contain sufficient information to provide a conclusive determination of the ratio.

In accordance with these objects, the present invention provides a system for comparing the ratio of two numbers in which the bits of each number are compared in groups comprising less than the total number of bits. The most significant groups of bits for the two numbers are first compared, and if they contain sufficient information to make the comparison, the result thereof is indicated. If the most significant group of bits does not contain sufficient information, the comparison is made based upon the next higher order group of bits that does contain sufficient information.

In some situations, a probable determination of the ratio of the two numbers can be made, based upon the information contained in one group of bits. However, it is desirable to obtain information about the next lower order group of bits in order to verify whether the probable determination is correct. In the system of the present invention, each of these situations has a unique address in a memory unit dedicated to the next lower order group of bits. In response to an input signal indicating that a probable determination subject to verification has been made, this memory unit provides an output signal that indicates the validity of the determination, based upon input information to this memory unit that is not contained in the higher order group of bits. Thus, a reliable determination is able to be made on the basis of more bits of information than those that are actually contained in one group.

The manner in which the present invention operates in accordance with the foregoing principles is more fully explained hereinafter with reference to the preferred embodiment illustrated in the accompanying drawings.

BRIEF DESCRIPTION OF THE DRAWINGS

FIGS. 2-5 are mapping charts indicating the manner in which various types of information can be stored in the memory units of the comparator.

DETAILED DESCRIPTION

The following description of the illustrated embodiment of the invention is made with particular reference to the situation in which the ratio of two eight-bit numbers are compared against a predetermined threshold value. However, it will be appreciated by those of ordinary skill in the art that the practical applications of the principles of the invention are not limited to this particular embodiment, but rather are useful in a variety of situations where two numbers are to be compared.

Figure 1:
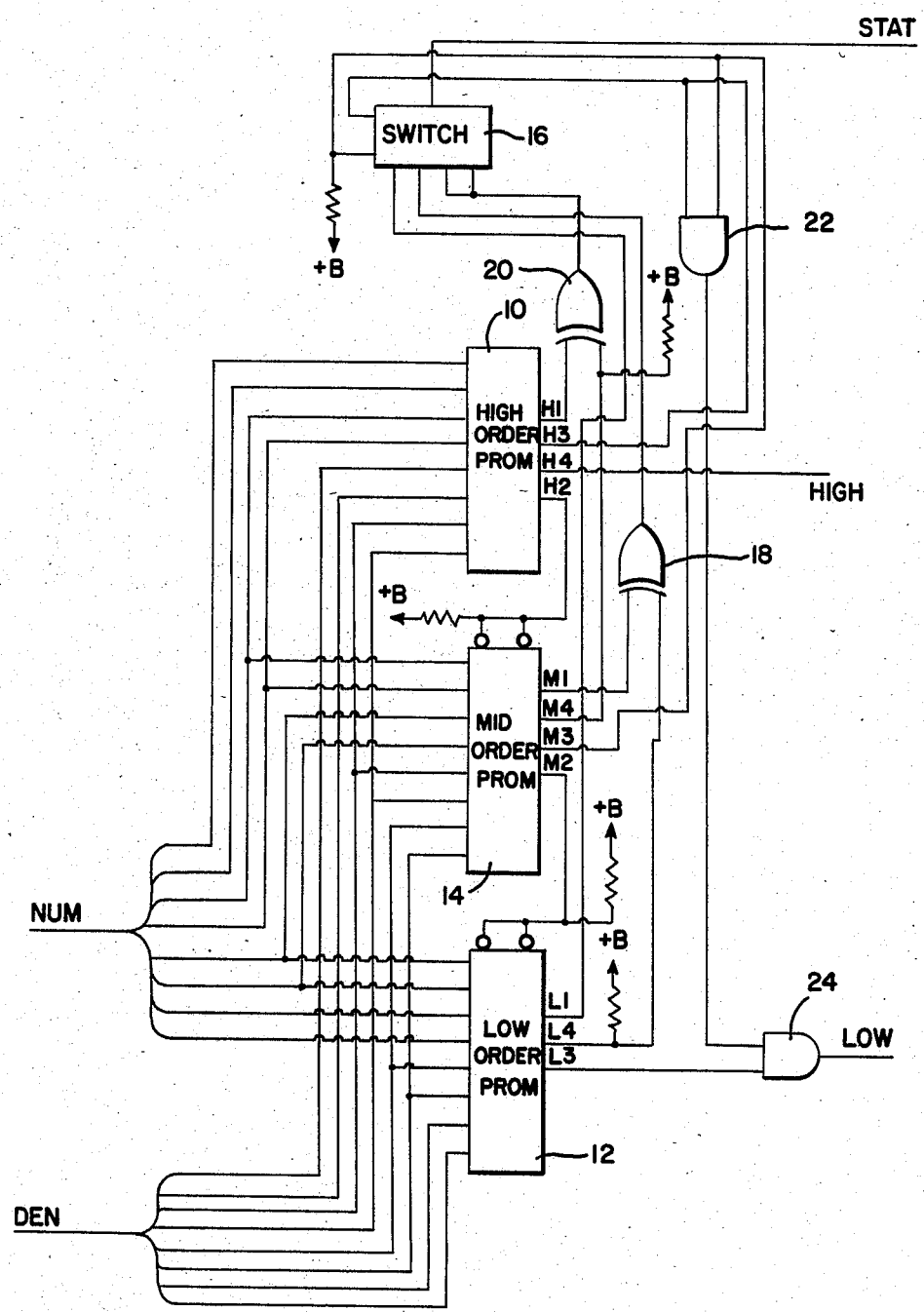
FIG. 1 is a circuit diagram, partially in block form, of the preferred embodiment of a comparator implementing the principles of the present invention.

The comparator illustrated in FIG. 1 includes a memory section comprised of three memory units that receive two eight-bit input signals indicating the two numbers to be compared. These memory units can be of any suitable conventional type. However, in the preferred embodiment they are programmable read-only memories (PROMs) and are referred to as such hereinafter. The input signals are respectively labelled NUM and DEN to signify their relative positions as the numerator and the denominator in the ratio that is to be compared against a fixed value. The fixed value that is used for explanatory purposes in this description is 0.7. When the ratio is less than or equal to this value, a binary one state is to be indicated, and when it exceeds this value a binary zero state is to be indicated.

One of the memory units, a high-order PROM 10, receives input information relating to the four most significant bits in each of the NUM and DEN signals. Another one of the memory units, a low-order PROM 12, receives the other bits of information, i.e. the four least significant bits, of each of the two input signals. The third memory unit, a mid-order PROM 14, receives the four bits of each input signal having a middle level of significance, i.e. the third, fourth, fifth, and sixth bits of each signal.

The high-order PROM 10 provides an output signal that indicates one of three conditions dependent upon the information contained in the input signals. For example, in the situation in which DEN is equal to 240 and NUM is equal to 128, the binary signals provided to the comparator are as shown below:

| NUM - 128 | 1 0 0 0 0 0 0 0 |
| NUM - 240 | 1 1 1 1 0 0 0 0 |

In this case the high-order PROM 10 will be comparing the signal 1000 to the signal 1111, i.e. 8:15. This information is sufficient to determine that the ratio of the two numbers is less than 0.7. Therefore a binary one signal is to be indicated and, for reasons that become apparent hereinafter, the high-order PROM 10 produces an output signal H1 that is the complement of this binary state.

Figure 2:
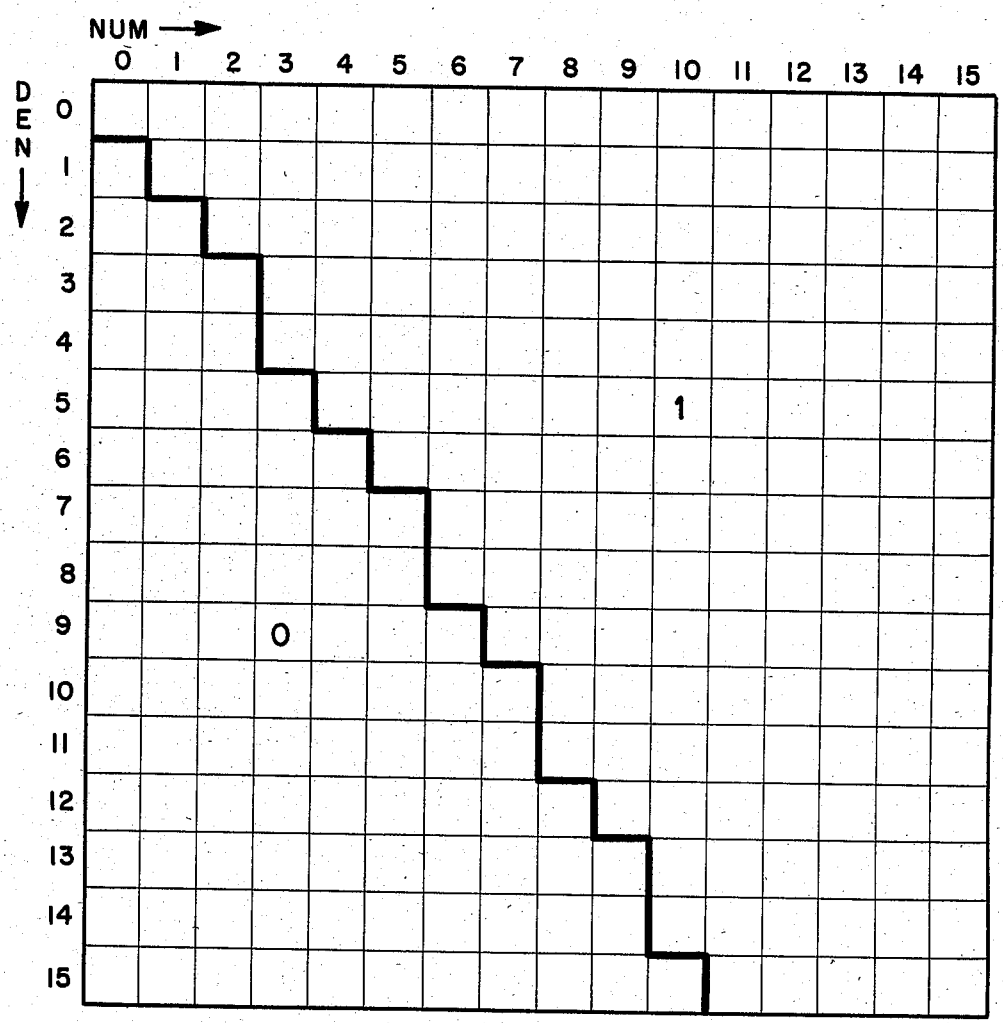

The manner in which information can be stored in the high-order PROM 10 to produce this H1 output signal is illustrated in the mapping chart of FIG. 2. Each of the four most significant bits of the NUM and DEN input signals represents a number from 0–15 that provides an address to the PROM. For each address indicated by the DEN signal, a binary one or zero is produced as the H1 output signal in dependence upon the address supplied by the NUM input signal. The demarcation between these two output states, as determined by the threshold value, is indicated by the heavy solid line in FIG. 2. For example, when the input signals NUM and DEN are the binary equivalents of 3 and 9, respectively, H1 is a binary zero, and when they are equal to 10 and 6, respectively, H1 is a binary one.

In the example illustrated above, the four most significant bits of the NUM and DEN input signals contain sufficient information to determine whether the ratio of the two numbers to be compared exceeds the threshold value. Consequently, there is no need to look at any of the other bits of information in the input signals, and the high-order PROM 10 produces a second output signal H2 that disables the mid-order PROM 14, which in turn disables the low-order PROM 12.

In other situations, in which the decimal equivalents of the NUM and DEN input signals are much lower, the high-order PROM 10 will not be provided with sufficient information to make a determination of the ratio of the two numbers. For example, if NUM is equal to 15 and DEN is equal to 16, the input signals provided to the comparator will be as indicated below:

| NUM - 15 | 0 0 0 0 1 1 1 1 |
| DEN - 16 | 0 0 0 1 0 0 0 0 |

In this case the high-order PROM 10 would attempt to compare a binary one signal with a binary zero signal. This is actually insufficient information to make an accurate determination, and so the high-order PROM 10 should relinquish control over the decision making process and enable the mid-order PROM 14 to make the decision and indicate whether the ratio exceeds the threshold value. The mid-order PROM 14 is therefore enabled by the H2 output signal from the high-order PROM 10 in this situation. The relinquishing of control by the high-order PROM 10 is indicated by an output signal H3.

Figure 3:
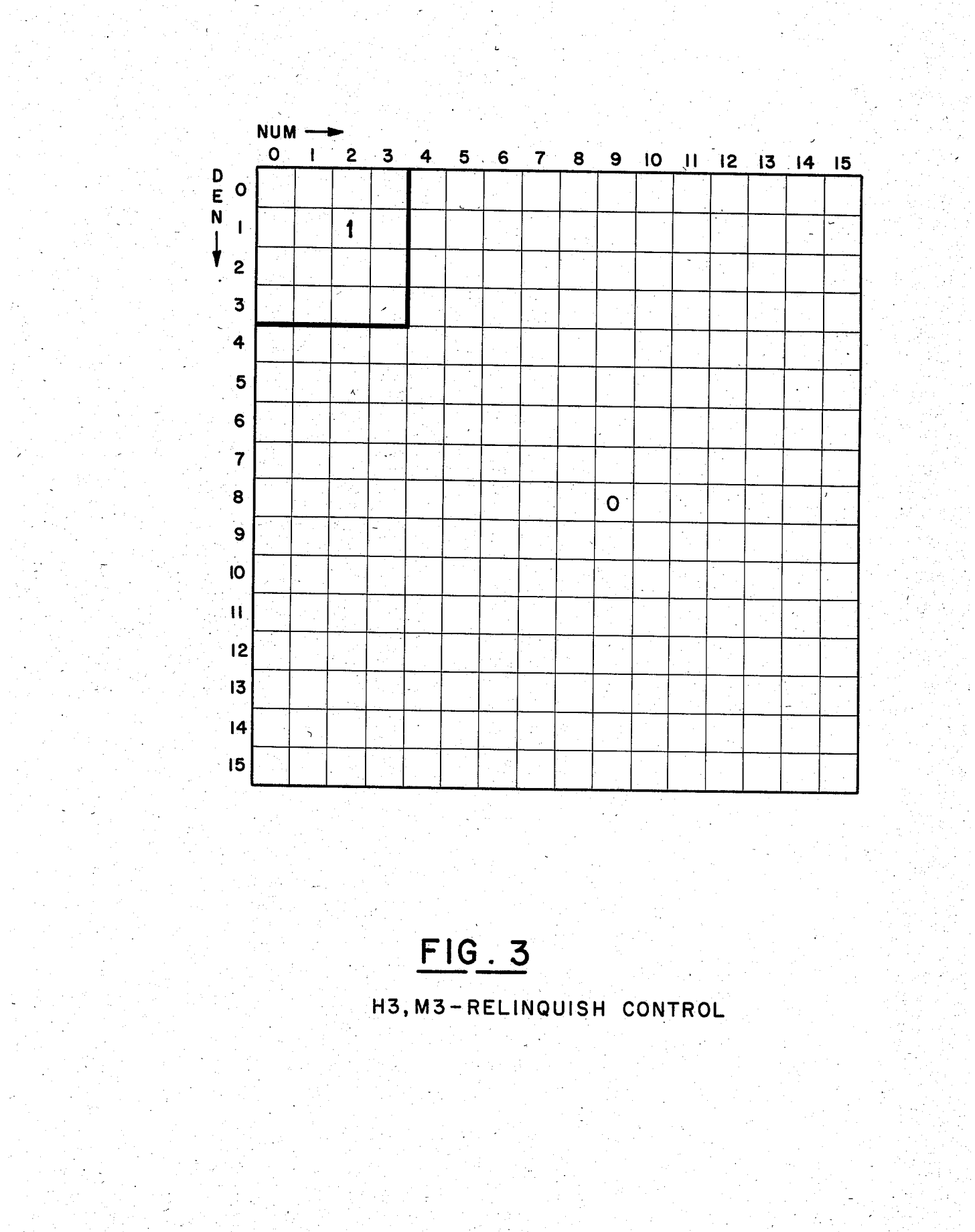

The manner in which information can be stored in the PROM 10 to provide the appropriate H3 output signal regarding its control over the decision making process is illustrated in the mapping chart of FIG. 3. It has been empirically determined that in the illustrated embodiment wherein three PROMs are employed to compare two eight-bit numbers, there is insufficient data to make a determination when the decimal equivalent of both input signals to a PROM is three or less. Therefore, as illustrated in FIG. 3, the PROM produces a binary one H3 signal whenever this situation occurs, to relinquish control over the process. If a greater number of PROMs are used, it may be desirable to relinquish control in a greater number of cases. For example, control can be relinquished when each signal has a value of 7 or less if the input signal to the next order PROM overlaps that provided to the high-order PROM by three bits, rather than two.

In the foregoing example where the high-order PROM 10 relinquishes control, the mid-order PROM 14 is enabled and compares a binary 4 signal to a binary 3 signal. Based upon this information, it provides a binary one output signal M1 to indicate that the detected ratio exceeds 0.7. This indication is provided by the mid-order PROM in the same manner that the H1 output signal is provided by the high-order PROM. Since the mid-order PROM 14 has sufficient information to make a decision, it disables the low-order PROM 12 by means of an output signal M2. However, if the mid-order PROM is also without sufficient information to make an accurate determination, it operates in a similar fashion as the high-order PROM to relinquish control over the decision making process and enable the low-order PROM 12 to provide an output signal L1 related to the detected ratio. The low-order PROM 12 is enabled by means of the signal M2 from the mid-order PROM, which also indicates that it is relinquishing control by means of an output signal M3.

The L1 output signal from the low-order PROM 12 is directly applied to one input terminal of a digital switch 16. The M1 and H1 output signals of the mid- and high-order PROMs 14 and 10, respectively, are applied to input terminals of the switch 16 by means of EXCLUSIVE-OR gates 18 and 20. The input terminals of the EXCLUSIVE-OR gates 18 and 20 that do not receive the M1 and H1 input signals are normally biased high, so that they normally invert the M1 and H1 signals. For this reason, the complement of the desired binary output signal STAT is stored in the high- and mid-order PROMs. Conversely, since the L1 signal is not inverted before it is presented to the switch 16, it does not appear as the complement of the desired STAT signal.

When the high-order PROM 10 has sufficient information to make a decision, as indicated by a binary zero H3 signal, the switch 16 connects the output terminal of the EXCLUSIVE-OR gate 20 to its output terminal to thereby provide the indication made by the high-order PROM 10 as the STAT output signal. If the high-order PROM 10 does not have sufficient information to render a decision and relinquishes control, the output signal H3 causes the switch 16 to connect its output terminal to the input terminal connected to the EXCLUSIVE-OR gate 18. If the mid-order PROM 14 also relinquishes control over the decision making process, the signals H3 and M3 cause the switch 16 to connect the STAT output terminal to the input terminal that receives the L1 output signal from the low-order PROM 12.

When the ratio of the numbers being provided to the PROMs for comparison is relatively close to 0.5 or 1.0, for example, the determination that the ratio is less than or greater than the threshold value of 0.7 is highly reliable. However, when the ratio of the two counts is quite close to the threshold value, the reliability of the indication from the PROM decreases. This consideration becomes particularly significant when the counts provided to the PROMs are relatively low.

For example, consider the two situations in which the ratios to be detected are 112:172 and 124:160. The input signals provided to the PROMs will be as indicated below:

| NUM - 112 | 01110000 |
|---|---|
| DEN - 172 | 10101100 |
| NUM - 124 | 01111100 |
| DEN - 160 | 10100000 |

The input signals provided to the high-order PROM will be the same in both cases. In other words, the four most significant bits of each number, that are provided to the high-order PROM, will be in the ratio 7:10, which lies exactly at the threshold value. Assuming that this value must be exceeded in order for the H1 signal to be in the binary one state, the high-order PROM will provide a signal that is a binary zero. However, this signal will only be correct in the first case, wherein the ratio 112:172 is equal to approximately 0.65. For the second case, the ratio 124:160 is equal to approximately 0.77, and hence the STAT signal should indicate the binary zero state, i.e. H1 should be a binary one. When the ratio lies close to the threshold value, the information contained in the next one or two bits, i.e. the third and fourth bits in these examples, becomes important. Consequently, it is desirable to be able to look at the next two digits in the NUM and DEN input signals to determine their ratio. In other words, it would be helpful to obtain information from the next lower order PROM to aid in a determination of whether the indication of the binary state provided by the high-order PROM 10 is correct or should be modified.

Upon analysis of those situations in which it is desirable to obtain modification information from the mid-order PROM, it has been discovered that the two pairs of bits that are common to both the high and the mid-order PROMs, i.e. the fifth and sixth bits in each sequence, are unique for each such situation. For example, in the situation depicted in the preceding illustration these two pairs of bits are 11,10 for the NUM and DEN signals, respectively. The two pairs of bits that are common to both the mid- and high-order PROMs in each of these various situations are set forth in the following Table.

| | Situations Requiring Additional Information | |
|---|---|---|
| Label | Ratio of Signals to High-Order PROM | Fifth and Sixth Bits of NUM and DEN Common to Both High- and Mid-Order PROMs NUM,DEN |
| A | 3:4 | 11,00 |
| B | 3:5 | 11,01 |
| C | 4:5 | 00,01 |
| D | 4:6 | 00,10 |
| E | 5:7 | 00,11 |
| F | 5:8 | 01,00 |
| G | 6:8 | 10,00 |
| H | 6:9 | 10,01 |
| I | 7:10 | 11,10 |
| J | 8:11 | 00,11 |
| K | 8:12 | 00,00 |
| L | 9:13 | 01,01 |
| M | 10:14 | 10,10 |
| N | 10:15 | 10,11 |

Since each of these pairs of bits comprising the two most significant bits in the input signals to the mid-order PROM are different, they represent a unique address signal to the mid-order PROM for each situation. Furthermore, the other two bits in the input signals to the mid-order PROM, i.e. the third and fourth bits, contain information sufficient to determine whether the decision made in the high-order PROM is correct. For example, in the previously discussed cases in which the input signals to the high-order PROM are in the ratio 7:10, if the two pairs of the least significant bits in the input signals to the mid-order PROM are 00,11 (NUM:DEN=112:172) the determination made in the high-order PROM that the ratio is less than 0.7 can be indicated to be correct. Alternatively, if these two pairs of bits are 11,00 (NUM:DEN=124:160), the indication from the high-order PROM is incorrect and should be modified.

Consequently, in those situations in which the high-order PROM 10 can only make an unreliable, or probable, decision, the mid-order PROM can be enabled to effectively "look at" the next two bits to determine the validity of that decision. The manner in which the present invention implements the foregoing principle is illustrated in FIGS. 4 and 5.

Figure 4:
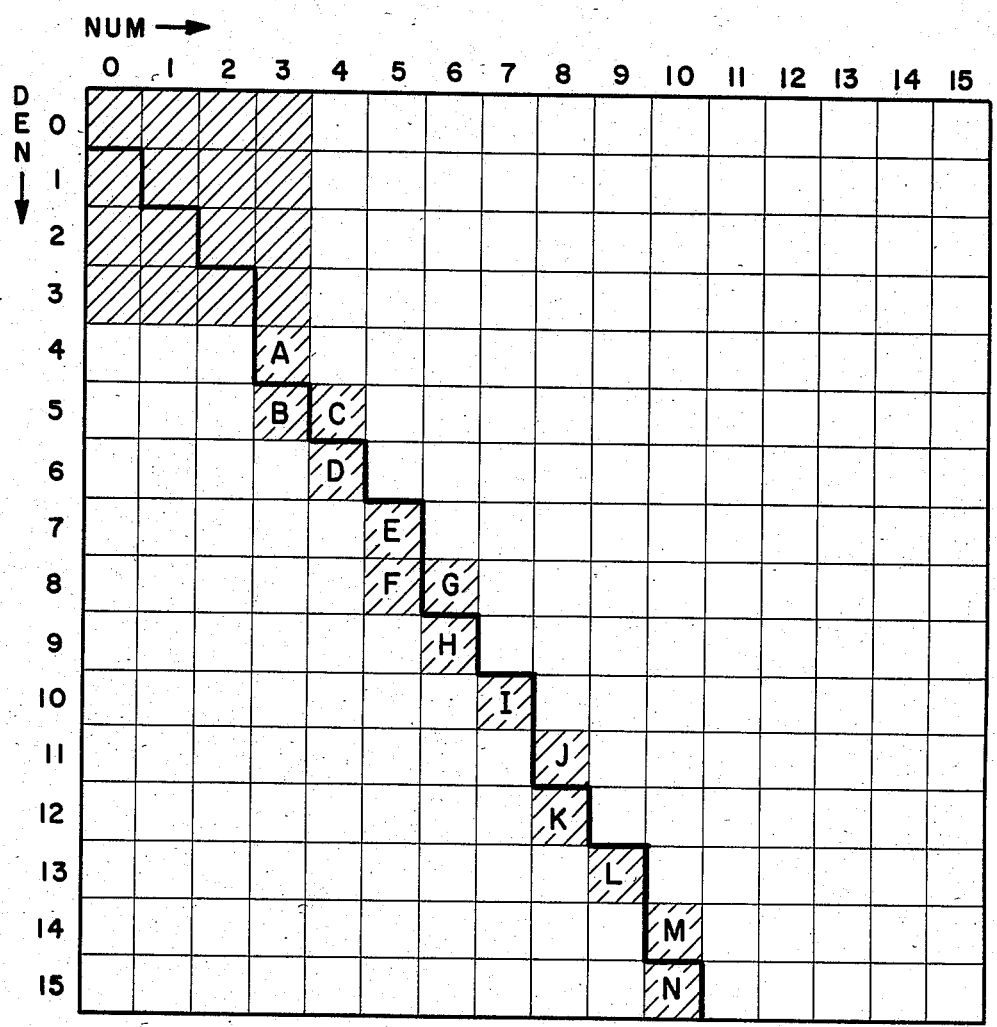
Figure 5:
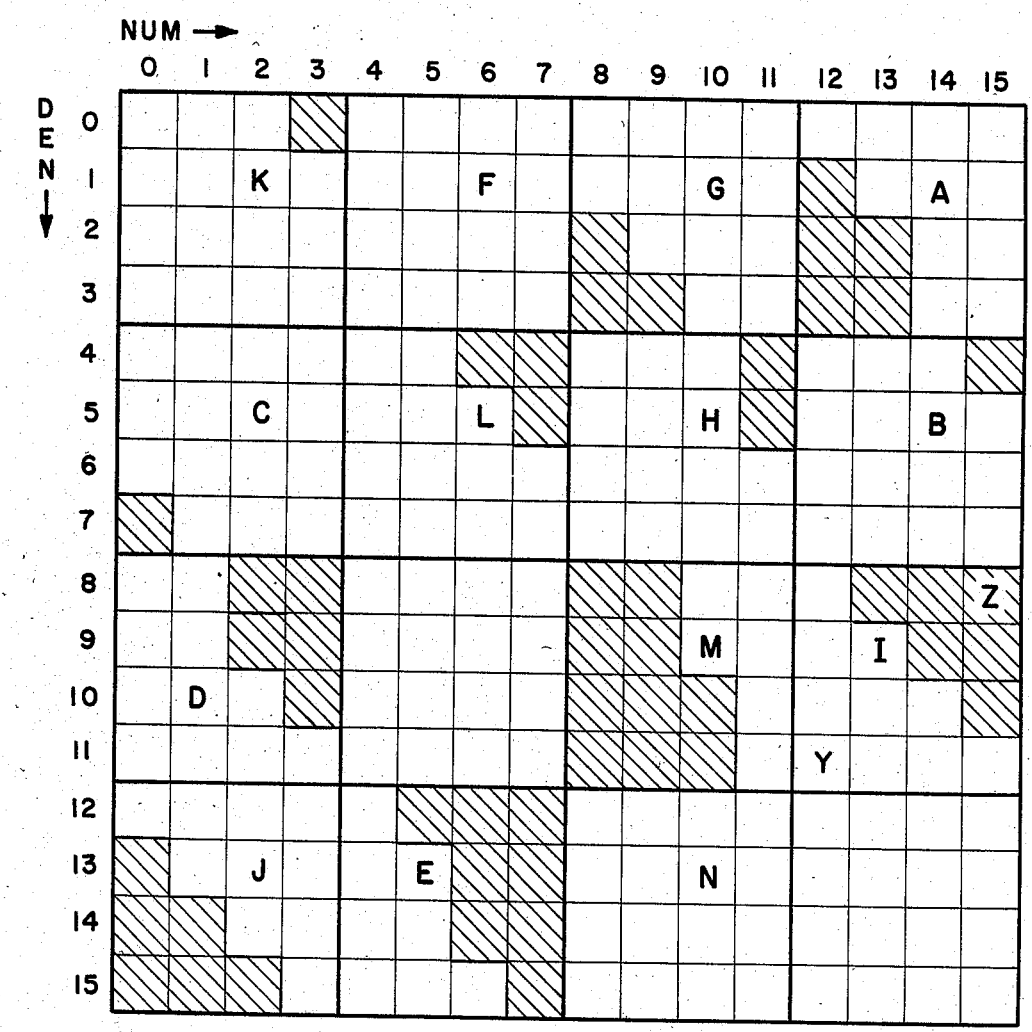

The mapping chart of FIG. 4 illustrates those situations, or addresses, in which the H2 output signal of the high-order PROM 10 goes to the binary zero state to enable the mid-order PROM 14. These situations are indicated by the shading in the chart. The shaded block in the upper left-hand corner of the chart corresponds to the situations depicted in FIG. 3 wherein the high-order PROM 10 relinquishes control over the decision making process. The remaining shaded portions of FIG. 4, labelled A-N, correspond to the situations set forth in Table 1. It will be noted that each of these situations lies adjacent the threshold line discussed previously with respect to FIG. 2.

It will be appreciated that a four-bit address signal comprised of the two pairs of bits that are common to both the high- and mid-order PROMs provide for sixteen different addresses. However, in the example illustrated in Table 1 and FIG. 4, only fourteen such addresses are utilized. If a greater number of addresses are required, the number of bits common to both PROMs can be increased.

As discussed previously, each of the situations depicted in Table 1 has a unique address location in the mid-order PROM 14. These locations are outlined as blocks in the mapping chart of FIG. 5. Referring again to the previous example wherein the ratio of the input signals to the high-order PROM is 7:10, the NUM and DEN input signals to the mid-order PROM 14 are 11XX and 10XX, respectively, where X could be a one or a zero. Thus, the NUM value is in the range of 12–15 and the DEN value is in the range of 8–11. The address of this block is denoted by the reference I in FIG. 5.

As is apparent from FIG. 5, each block comprises sixteen storage locations within the PROM. The particular one of these storage locations that is called upon to provide an output signal indicating the validity of the high-order PROM's indication is determined by the two least significant bits in each of the NUM and DEN signals provided to the mid-order PROM. In other words, these four bits determine the address of one storage location within the addressed block. For example, where the ratio NUM:DEN is 112:172, the address within the block I is 00,11, labelled Y in FIG. 5. Since the probable indication from the high-order PROM 10 is correct in this situation, the output signal from this storage location is a binary one. This signal is labelled M4 in FIG. 1, and is applied to the other input terminal of the EXCLUSIVE-OR gate 20. This binary one causes the gate 20 to invert the H1 output signal from the high-order PROM 10. However, since the H1 signal is the complement of the desired indication, the appropriate signal is provided to the switch 16 to be transmitted as the STAT output signal.

In another situation in which the ratio NUM:DEN is 124:160, the probable indication from the high-order PROM is incorrect, as noted previously. In this situation, the address of the storage location within the block I is 11,00, labelled Z in FIG. 5. The output signal M4 from this location is a binary zero indicated by the shading in FIG. 5. In this case, the output signal H1 from the high-order PROM 10 is not inverted by the EXCLUSIVE-OR gate 20. Consequently, the appropriate binary signal is again provided to the switch 16 for transmittal as the STAT signal.

The various input conditions under which the output signal from the high-order PROM should be modified, indicated by the shaded areas in FIG. 5, are empirically determined for each combination of input signals to the mid-order PROM. It is to be noted that no situations occurring within the blocks labelled F and N require modification of the H1 signal. Therefore, these situations need not be included in the shaded portions of the chart illustrated in FIG. 4.

In summary, there are three types of conditions that the high-order PROM is capable of indicating. The first of these is that the most significant bits in the NUM and DEN signals contain sufficient information to make a decision as to their ratio, and an indication is provided of this ratio relative to the threshold value. In this condition, both the mid- and low-order PROMs are disabled and have no influence upon the decision making process. In the second case, the high-order PROM does not receive sufficient information to render a decision and therefore relinquishes control over the decision making process and enables the mid-order PROM 14. In the third case, the high-order PROM has information sufficient to make a probable decision about the binary state of the input signal, but such decision is not totally reliable. In this case, the high-order PROM does not relinquish control over the decision making process, but it does enable the mid-order PROM to provide an output signal. This output signal from the mid-order PROM is capable of modifying that of the high-order PROM so that a more reliable signal is provided to the switch 16. In this case, the mid-order PROM 14 enables a determination to be made on the basis of the six most significant bits of each input signal without all six bits being compared against one another in unison. In other words, it provides an extension of the capabilities of the high-order PROM by effectively increasing the number of bits upon which a decision is made.

The relationship described above with respect to the high- and mid-order PROMs also exists between the mid- and low-order PROMs. When the high-order PROM relinquishes control over the decision making process, the mid-order PROM can either (a) provide a definite indication of the detected ratio and disable the low-order PROM, (b) relinquish control over the decision making process and enable the low-order PROM, or (c) provide a probable indication of the detected ratio and enable the low-order PROM to modify the probable indication, if required. Of course, when condition (b) occurs, the low-order PROM 12 must provide a definite indication of the detected ratio, by way of output signal L1, since there are no further PROMs upon which it can rely for help.

The mid-order PROM 14, which provides a four-bit output signal for each address, i.e. each combination of NUM and DEN signals, can be implemented with a $4\times256$ bit capacity PROM. The high- and low-order PROMs 10 and 12, which are only required to provide three- and two-bit output signals, respectively, can be implemented with memory units having correspondingly lower capacity. Alternatively, if it is desired to use the same type of memory units as that used for the mid-order PROM 14, the extra memory capacity can be employed to perform other functions.

For example, it may be desirable to provide an indication whenever either or both of the NUM and DEN signals fall outside a predetermined range of values. Co-pending application Ser. No. 365,085, file date 4-2-82 entitled "Demodulator For Asynchronous Binary Signals" discloses one situation in which it is desirable to do so, in order to switch the frequency of a clock signal. The extra storage capacity in the high-order PROM 10 can be used to provide an output signal H4 whenever the NUM and DEN input signals exceed a predetermined value. Similarly, the low-order PROM 12 can provide an output signal L3 whenever the input signals NUM and DEN are less than a second predetermined value. Since the low-order PROM 12 only receives the four least significant bits of each input signal, it is necessary to insure that the indication that the signals are too low is only produced when the bits of greater significance are zero. To accomplish this function, the H3 and M3 output signals are provided to the input terminals of an AND gate 22. This AND gate is enabled only when both of the high- and mid-order PROMs relinquish control over the decision making process, which occurs only when at least the four most significant bits of each of the NUM and DEN signals is zero. The output signal from the AND gate 22 is provided to one input terminal of a second AND gate 24, which also receives the L3 output signal from the low-order PROM 12. This AND gate produces a LOW output signal whenever the PROM 12 provides the L3 output signal and the AND gate 22 is enabled.

From the foregoing it will be appreciated that the comparison of two eight-bit binary signals, or more particularly the comparison of their ratio against a predetermined threshold, can be accomplished with a maximum of three PROMs each having 4×256 bit memory capacity, or a total of slightly more than 3000 bits of storage capacity. This is to be contrasted with the more than 65,000 bits of storage capacity that was previously required.

If greater resolution is required in the process, a greater number of PROMs can be utilized. More particularly, the mid-order decision making unit can comprise a number of PROMs, to thereby provide greater overlap between the input signals provided to each of the various PROMs. In such a case, control over the decision making process can be relinquished by an individual PROM in a greater number of situations, as explained previously with regard to the example where NUM equals 15 and DEN equals 16.

In addition, a slightly larger PROM can be used to provide a greater number of situations in which the decision from a higher order PROM can be modified. For example, a mid-order PROM receiving five bits of each of the NUM and DEN signals would allow an overlap of three bits with the high-order PROM and thereby provide 64 possible modification situations. Alternatively, if only two bits of each signal overlap with the high-order PROM, the decision making capabilities of the high-order PROM can be extended by three bits, i.e. 64 different possible modifications in each situation. The size and number of PROMs, and the bit overlap between PROMs, will depend in each application upon the degree of resolution required vis-a-vis the acceptable memory costs.

The present invention can be embodied in other specific forms without departing from the spirit or essential characteristics thereof. The presently disclosed embodiment is therefore considered in all respects to be illustrative and not restrictive. The scope of the invention is indicated by the appended claims rather than the foregoing description, and all changes that come within the meaning and range of equivalency of the claims are therefore intended to be embraced therein.

What is claimed is:

1. Apparatus for comparing the ratio of two binary numbers to a predetermined thresold, comprising:
   a first memory unit for receiving input information relating to data of a particular level of significance concerning each of the two binary numbers and providing an output signal that signifies one of (a) a definite indication whether their ratio excedds the threshold, (b) a probable indication of whether their ratio exceeds the threshold, and (c) a lack of sufficient data to determine whether their ratio exceeds the threshold;
   a second memory unit for receiving input information containing data of lesser significance than that received by said first memory unit and, in response to a signal from said first memory unit signifying condition (c), providing an output signal that signifies whether their ratio exceeds the threshold, and in response to a signal from said first memory unit signifying condition (b), providing a signal indicating the validity of a probable indication from said first memory unit; and
   switching means responsive to the output signals from each of said memory units for transmitting an indication relating to whether the ratio of the binary numbers exceeds the predetermined threshold.

2. Apparatus for comparing the ratio of two binary numbers to a predetermined threshold, comprising:
   a high-order memory unit for receiving input information relating to the most significant data concerning each of the two binary numbers and providing an output signal that signifies one of (a) a definite indication whether their ratio exceeds the threshold, (b) a probable indication of whether their ratio exceeds the threshold, and (c) a lack of sufficient data to determine whether their ratio exceeds the threshold;
   a mid-order memory unit for receiving input information containing some of the most significant data and some data of lesser significance concerning each of the two binary numbers and, in response to a signal from said high-order memory unit signifying either of conditions (b) or (c), providing an output signal that signifies one of (d) a definite indication of whether their ratio exceeds the threshold, (e) a probable indication of whether their ratio exceeds the threshold, and (f) a lack of sufficient data to determine whether their ratio exceeds the threshold, and a signal indicating the validity of a probable indication from said high-order memory unit;
   a low-order memory unit for receiving input information relating to the least significant data concerning each of the two binary signals and, in response to a signal from said mid-order memory unit signifying either of conditions (e) and (f), providing an output signal that signifies whether their ratio exceeds the threshold and a signal indicating the validity of a probable indication from said mid-order memory unit; and
   switching means responsive to the output signals from each of said memory units for transmitting an indication relating to whether the ratio of the binary numbers exceeds the predetermined threshold.

3. The apparatus of claim 2 wherein said switching means includes a logic circuit for modifying a probable indication signal from said high-order memory unit in response to an invalid indication from said mid-order memory unit, and for modifying a probable indication from said mid-order memory unit in response to an invalid indication from said low-order memory unit.

4. The apparatus of claim 3 wherein said logic circuit comprises a first logic gate that receives the definite and probable indications from said high-order memory unit and the indication of validity from said mid-order memory unit, and selectively modifies the indication from said high-order memory unit in response to the signal from said mid-order memory unit.

5. The apparatus of claim 4 wherein said logic circuit further comprises a second logic gate that receives the definite and probable indications from said mid-order memory unit and the indication of validity from said low-order memory unit, and selectively modifies the indication from said mid-order memory unit in response to the signal from said low-order memory unit.

6. The apparatus of claim 5 wherein said first and second logic gates comprise EXCLUSIVE-OR gates.

7. The apparatus of claim 5 or 6 wherein said switching means is responsive to whether said high-order memory unit provides an indication or lacks sufficient information to selectively convey the signal from said first or second logic gate.

8. The apparatus of claim 7 wherein said switching means is further responsive to both the conditions (c) and (f) to convey the output signal from said low-order memory unit.

9. Apparatus for comparing the ratio of two binary numbers to a predetermined threshold, comprising:
a high-order memory unit for receiving input information relating to the most significant data concerning each of the two binary numbers and providing an output signal that signifies one of (a) a definite indication whether their ratio exceeds the threshold, and (b) a lack of sufficient data to determine whether their ratio exceeds the threshold;
a mid-order memory unit for receiving input information containing some of the most significant data and some of the least significant data concerning each of the two binary numbers and, in response to a signal from said high-order memory unit signifying condition (b), providing an output signal that signifies one of (c) a definite indication of whether their ratio exceeds the threshold, and (d) a lack of sufficient data to determine whether their ratio exceeds the threshold;
a low-order memory unit for receiving input information relating to the least significant data concerning each of the two binary signals and, in response to a signal from said mid-order memory unit signifying condition (d), providing an output signal that signifies whether their ratio exceeds the threshold; and
switching means responsive to the output signals from each of said memory units for transmitting an indication relating to whether the ratio of the binary numbers exceeds the predetermined threshold.

10. The apparatus of claim 2 or 9 wherein said switching means is responsive to the condition wherein said high-order memory unit lacks sufficient information to selectively convey the indication from said mid-order memory unit, and the condition wherein both the high- and mid-order memory units lack sufficient information to convey the indication from said low-order memory unit.

11. A method for indicating an actual characteristic of a relationship of two binary numbers, comprising the steps of:
addressing a first memory in accordance with a first group of bits having a particualr level of significance in each of the two binary numbers;
generating from said first memory a signal indicating the probable characteristic of said relationship;
determining whether the information contained in said first group of bits is within a preselected set of values;
addressing a second memory in accordance with a second group of bits of lower significance than said first group of bits in the binary numbers;
generating a modification signal from said second memory when the information contained in said first group of bits is determined to be within said preselected set of values;
selectively modifying said indicating signal in accordance with said modification signal to produce a signal representative of the actual characteristic of said relationship.

12. The method of claim 11 including the further steps of determining whether the first group of bits contains in sufficient information to establish the relationship, generating from said second memory another signal representative of said actual characteristic, and selecting one of said two signals that are representative of said actual characteristic in response to said determination of whether the first group of bits contains insufficient information.

13. The method of claim 11 or 12 wherein the second group of bits overlaps the first group of bits.

14. The method of claim 11 or 12 wherein said characteristic is the ratio of the two numbers relative to a threshold value.

15. Apparatus for indicating a characteristic of a relationship of two numbers, comprising:
means for providing a probable indication of said characteristic on the basis of information contained in a first group of digits having a particular level of significance in the two binary numbers; and
means for selectively modifying said indication in response to information contained in a second group of digits of lower significance than said particular level of significance in the two binary numbers.

16. The apparatus of claim 15 further including means for indicating said characteristic on the basis of information contained in the second group of digits, means for determining whether said first group of digits contains sufficient information to establish the relationship, and means for selecting one of the selectively modified indication and the indication based on the second group of digits in response to said determining means.

17. The apparatus of claim 15 wherein said indicating means includes means to enable said modifying means when the information in the first group of digits is within a preselected set of values.

18. The apparatus of claim 15, 16 or 17 wherein the second group of digits overlaps the first group of digits.

19. The apparatus of claim 15, 16 or 17 wherein said characteristic is the relationship of the ratio of the two numbers to a predetermined threshold.

20. Apparatus for comparing the ratio of two numbers to a predetermined threshold, comprising:
a first memory unit for receiving input information relating to data of a particular level of significance concerning each of the two numbers and providing an output signal that conditionally signifies whether ratio exceeds the threshold;
a second memory unit for receiving input information containing a data of lesser significance than that received by said first memory unit and providing an output signal indicating the validity of the signal from said first memory unit; and
means responsive to the output signal from said second memory unit for selectively modifying the signal from said first memory unit.

21. The apparatus of claim 20 wherein said first memory unit provides a signal to enable said second memory unit to provide said validity signal when the input information to said first memory unit is within a preselected group of values.

22. The apparatus of claim 20 wherein said enable signal from said first memory unit also enables said second memory unit to provide a signal indicating whether the ratio of the binary numbers exceeds the threshold.

23. Apparatus for indicating a characteristic of a relationship of two numbers, comprising:

means for providing a first probable indication of said characteristic on the basis of information contained in a first group of digits having a particular level of significance in the two binary numbers;

means responsive to the information contained in said first group of digits for determining whether the information contained in said first group of digits is insufficient to determine said characteristic;

means for providing a second probable indication of said characteristic on the basis of information contained in a second group of digits of lower significance than said first group of digits; and means responsive to said determining means for selecting one of said first and second probable indications.

24. The apparatus of claim 23 wherein said characteristic is the ratio of the two numbers relative to a threshold value.

* * * * *

UNITED STATES PATENT AND TRADEMARK OFFICE
CERTIFICATE OF CORRECTION

PATENT NO. : 4,584,556

DATED : April 22, 1986

INVENTOR(S) : Steven S. Chan

It is certified that error appears in the above-identified patent and that said Letters Patent is hereby corrected as shown below:

Column 9, line 46, change "thresold" to --threshold--;

line 51, change "excedds" to --exceeds--;

Column 11, line 62, after "values;" add --and--;

Column 12, line 1, change "in sufficient" to --insufficient--;

line 48, following "whether" insert --their--;

line 50, delete "a".

Signed and Sealed this

Twenty-eighth Day of October, 1986

[SEAL]

*Attest:*

DONALD J. QUIGG

*Attesting Officer*     *Commissioner of Patents and Trademarks*